United States Patent
Wakai et al.

(10) Patent No.: US 7,027,390 B2
(45) Date of Patent: Apr. 11, 2006

(54) PACKET ROUTING APPARATUS AND A METHOD OF COMMUNICATING A PACKET

(75) Inventors: Junnosuke Wakai, Hadano (JP); Hirofumi Masukawa, Isehara (JP); Taketoshi Kawashima, Yokohama (JP); Kazumi Hakuta, Fujisawa (JP); Tomohiro Baba, Tachikawa (JP); Shiro Ohtani, Hadano (JP); Hisanori Kimoto, Ebina (JP)

(73) Assignee: Hitachi, Ltd., Tokyo (JP)

( * ) Notice: Subject to any disclaimer, the term of this patent is extended or adjusted under 35 U.S.C. 154(b) by 958 days.

(21) Appl. No.: 10/061,167

(22) Filed: Feb. 4, 2002

(65) Prior Publication Data

US 2002/0110136 A1    Aug. 15, 2002

(30) Foreign Application Priority Data

Feb. 7, 2001    (JP) .............................. 2001-030821

(51) Int. Cl.
    *H04L 1/00*    (2006.01)
(52) U.S. Cl. ...................................... 370/218; 370/392
(58) Field of Classification Search ...................... None
    See application file for complete search history.

(56) References Cited

U.S. PATENT DOCUMENTS 6,359,858 B1*    3/2002    Smith et al. ................. 370/217
6,856,594 B1*    2/2005    Aihara et al. ................ 370/228
6,876,660 B1*    4/2005    Hughes et al. ............ 370/395.4
6,940,808 B1*    9/2005    Shields et al. ............... 370/216
2002/0075798 A1*    6/2002    Sekine et al. ................ 370/228
2002/0141332 A1*    10/2002    Barnard et al. ............. 370/218
2003/0012134 A1*    1/2003    Ikawa .......................... 370/227
2003/0043734 A1*    3/2003    Takeguchi ................... 370/216

FOREIGN PATENT DOCUMENTS

JP    10-13449    1/1998

OTHER PUBLICATIONS

Patent Abstracts of Japan 10-013449 Jan. 16, 1998.
James Manchester, et al.; "IP over SONET"; IEEE Communications Magazine; May 1998; pps. 136-142.

* cited by examiner

*Primary Examiner*—Chau Nguyen
*Assistant Examiner*—Anthony Sol
(74) *Attorney, Agent, or Firm*—Mattingly, Stanger, Malur & Brundidge, P.C.

(57) ABSTRACT

When any communication port receives a packet from a network, it transmits the packet to a relay processing section. The relay processing section identifies a relay processing section of a transfer destination according to destination information included in the packet to transmit the packet to a packet switch section. When the relay processing section of the transfer destination is a working relay processing section, the packet switch section transfers the packet to the working relay processing section and a protection relay processing section.

15 Claims, 9 Drawing Sheets

FIG. 3 ROUTING TABLE CONFIGURATION

| DESTINATION IP ADDRESS | RP NUMBER | PORT NUMBER |
|---|---|---|
| 192.168.1.1 | #0 | PORT 2 |

FIG. 4 APS REGISTER CONFIGURATION

| RP NUMBER | #0/1 | #2/3 | #4/5 | #6/7 | #8/9 |
|---|---|---|---|---|---|
| 1: APS PRESENCE<br>0: APS ABSENCE | 1 | 0 OR 1 | 0 OR 1 | 0 OR 1 | 0 OR 1 |

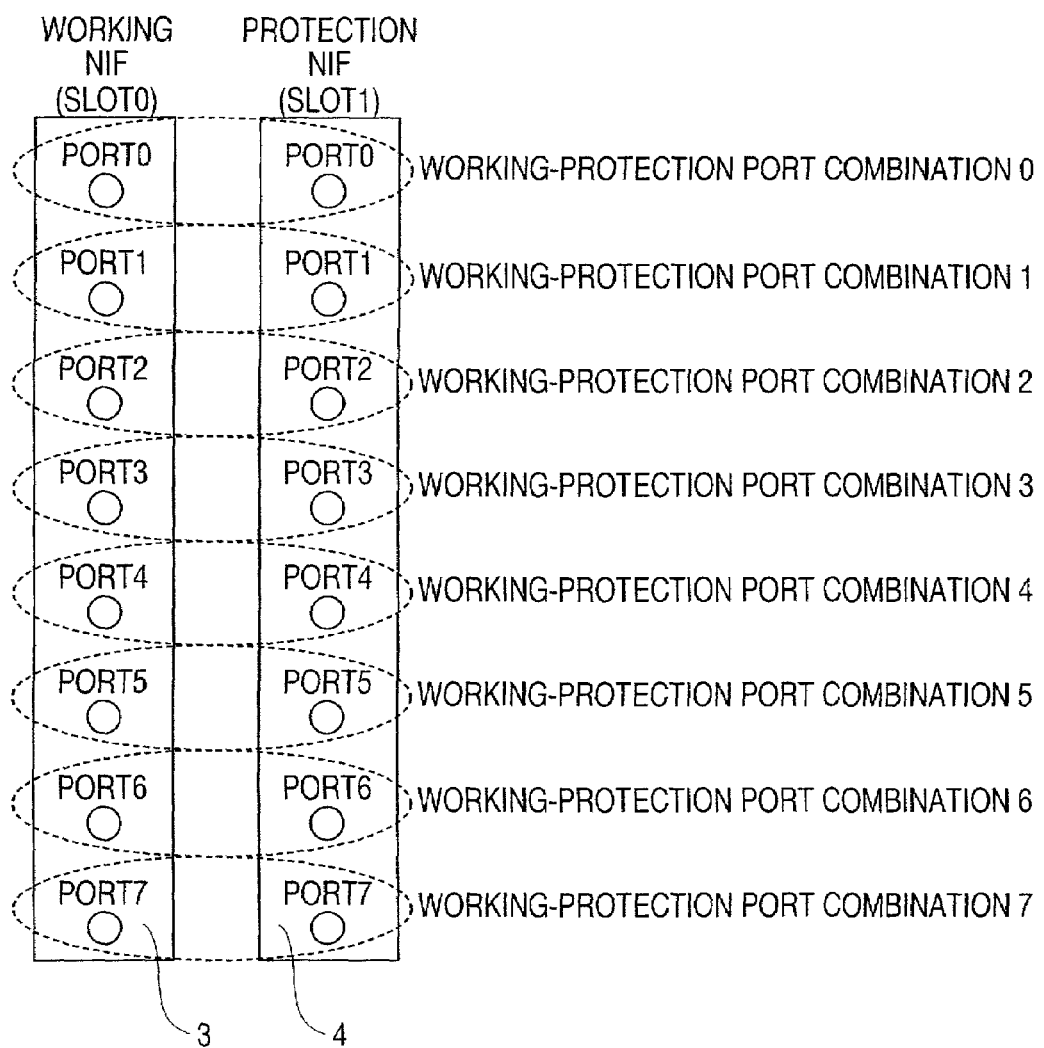

PACKET ROUTING APPARATUS AND A METHOD OF COMMUNICATING A PACKET

BACKGROUND OF THE INVENTION

The present invention relates to a packet routing apparatus and a method of communicating a packet, and in particular to a packet routing apparatus and a method of communicating a packet which performs protection switching (line) at a time of failure occurrence in a network layer or a lower layer in a packet routing apparatus employing a redundancy or protection switching.

In recent years, communication apparatuses provided with not only a system required for a normal operation but also a backup system to allow backup of various communications, so-called "redundancy (for example, doubled configuration)", are spreading widely for failure measure in various communication systems. In the communication system provided with the redundancy, for example, a plurality of processors, file devices or the like (which respectively serve as workings and protections) are provided, thereby allowing switching in 1+1 or 1:n manner at a time of failure occurrence.

In an IP network constituted with a plurality of IP packet routing apparatuses, a route failure is detected using a routing protocol for exchanging route information pieces. As the routing protocol used in this IP network, for example, there are ROUTING INFORMATION PROTOCOL (RIP), OPEN SHORTEST PATH FIRST (OSPF) or the like. In a failure detection according to OSPE, for example, communications are periodically performed between IP packet routing apparatuses using a Hello packet for confirming connection of the IP packet routing apparatuses. A reliability of a route is verified by a communication or conduction test between the IP packet routing apparatuses. Incidentally, information about connection between the IP packet routing apparatuses is stored, for example, in a routing table in a processor.

Also, the routing protocol used in the IP network performs, for example, route selection, communication between IP packet routing apparatuses, update of a routing table, when a route failure is detected. Incidentally, a switching time from a working route to a protection route for failure recovery requires several tens seconds to several minutes.

On the other hand, in a public network, a failure detection is carried out by a SYNCHRONOUS DIGITAL HERARCHY (SDH: SONET in northern America) system prescribed in INTERNATIONAL TELECOMMUNICATION UNION TELECOMMUNICATION STANDARDIZATION SECTOR (ITU-T) RECOMMENDATION G.707 (refer to 9.2.2 SOH BYTES DESCRIPTION OF RECOMMENDATION G.707). This SDH system is constituted with, for example, SDH transport systems. A packet where a frame multiplexed with a user signal, called VIRTUAL CONTAINER (VC), is attached with a header, so-called a section overhead, is used for transmission between respective SDH transport systems.

Mapped on the section overhead is information for performing switching at a time of failure. In the SDH system, switching between the working line and the protection line is performed at a time of failure on the basis of the mapped information. This switching system is called "AUTOMTIC RPOTECTION SWITCHING (APS) system and prescribed in BELLCORE GR-253-CORE, ITU-T G.782.

According to the APS system, a transmission network with a high reliability and a high maintenance can be configured so that a high reliability required for a public network can be achieved. Also, in the APS system, a switching sequence including an external device is defined, and a switching time from a working line to a protection line for failure recovery is within 50 ms.

Also, recently, a high speed IP packet routing apparatus has been introduced even in the public network. This is because data system traffic flowing on a network is rapidly increasing due to a rapid spreading of computers and shifting from a network configuration mainly comprising audio or sound system traffics through conventional public switches to a network configuration mainly comprising data system traffic through high speed IP packet routing apparatuses becomes significant.

In a network where the IP packet routing apparatus has been introduced into the public network, the IP packet routing apparatus and the above-mentioned SDH transport system are ordinarily used in a mixed manner. Also, there is an approach which realizes the SDH system with an IP packet routing apparatus provided with a SDH interface without using a SDH transport system. Such a network obtained by the combination of the IP packet routing apparatus and the SDH system is called "IP OVER SDH (SONET) system (refer to IEEE COMMUNICATION MAGAZINE, MAY 1998, P136–142).

In a failure detection performed by this IP OVER SDH system, switching from a working line to a protection line can rapidly be performed by the APS switching system at a time of failure occurrence in a physical layer such as a line failure, a failure of a physical layer processing section in the IP packet routing apparatus or the like. Incidentally, at this time, since a high speed switching at the physical layer is not detected at an ordinary network layer, a routing protocol operating in a network layer is not actuated.

Also, at a time of failure occurrence in the network layer due to a failure of a network layer processing section in the IP packet routing apparatus or the like, since it is impossible to recover the failure by such a switching in the physical layer, the routing protocol is activated to perform switching in the network layer. That is, the failure recovery in the network of the IP OVER SDH (SONET) system comprises a recovery performed by the APS of the physical layer and a recovery performed by the routing protocol of the network layer.

In a network in which a high reliability is required, such as a public network, it is desirable that all failures including a line failure, a node failure, and the like can be recovered rapidly with a high reliability. For this reason, when such a failure as a failure in the network layer can not be recovered by only the recovery of the APS, a high speed and high reliable switching approach is inevitable in a case that a switching is performed in the network layer.

There have been proposed several approaches where a switching in the network layer is realized in a network where a high reliability is required, such as a public network or the like. As one of these approaches, for example, there is a technique described in Japanese Patent Application Laid-Open (JP-A) No. 10-13449 publication.

In JP-A 10-13449, such a technique is employed that the status change of K1, K2 bytes serving as the APS byte are monitored and, when a status change of the APS byte occurs due to a failure, a routing protocol of a network layer is actuated to update a routing table and perform a line switching.

Also, as another approach, for example, there is an approach where a switching from a working line to a protection line is performed without actuating a routing protocol and without updating a routing table. For example, there are an approach where a working configuration and a protection configuration serving as configurations for transmission/reception of a packet are prepared in each communication or routing apparatus, and a packet is copied by a software processing and packets are transmitted in a multicast manner from both the working configuration and the protection configuration so that a configuration for receiving a packet in only an apparatus on a reception side is switched from the working configuration to the protection configuration at a time of failure occurrence, and another approach where a transmission destination (address) for performing transmission by a working configuration and a transmission destination for performing transmission by a protection configuration are stored in a routing table, and packets are transmitted from both the working and protection configurations according to an address retrieval so that only an apparatus on a reception side is switched from the working configuration to the protection configuration at a time of failure occurrence like the former approach.

SUMMARY OF THE INVENTION

In the art disclosed in JP-A 10-13449, however, it is considered that, since the routing table is updated at a time of switching, it is difficult to recover a failure in a short time.

Also, in the above-mentioned approach where updating of a routing table according to a routing protocol is not performed, it is considered that, in a case that a packet processed in a software manner is transmitted in a multicasting manner from both the working configuration and protection configuration and only a reception side apparatus is switched from the working configuration to the protection configuration at a time of failure occurrence, it is difficult to perform a switching in a short time due to an interposition of a software.

Furthermore, in the above-mentioned approach where updating of a routing table according to a routing protocol is not performed, it is considered that, in a case that two transmission destinations according to a working configuration and a protection configuration are stored in a routing table, a buffer amount for storing destinations is doubled as compared to an ordinary buffer amount, so that mounting or packaging and cost reduction will be made difficult. Further, it is considered that a vast time may be required for writing in a routing table at an initialization time.

In view of the above, an object of the present invention is to provide a packet routing apparatus and a method of communicating a packet where rapid and high reliable failure detection and protection switching are performed at a time of failure occurrence in a network layer in a packet routing apparatus having a protection or redundancy.

A packet routing apparatus according to the present invention is provided with a plurality of communication ports including at least one working communication port which performs transmission/reception of a packet to a network and at least one protection communication port which performs transmission/reception of the same packet as the packet which is transmitted/received to the network by the working communication port. The plurality of communication ports are respectively connected to a plurality of relay processing sections. The plurality of relay processing sections include at least one working relay processing section connected to at least one working communication port and at least one protection relay processing section connected to at least one a protection communication port. Each relay processing section transmits a packet transferred from anther relay processing section to a communication port connected thereto and the received packet is transmitted from the another relay processing section to another relay processing section according to destination information included in the packet transferred. The plurality of relay processing sections are connected to a packet switch section. The packet switch section receives a packet from any one of the relay processing sections and transmits the packet to another relay processing section according to destination information included in the packet. Furthermore, each of the plurality of relay processing sections is provided with a configuration information storage section which stores information about whether it is a working relay processing section or a protection relay processing section corresponding to the working relay processing section. The packet switch section refers to its own configuration information storage section and when a relay processing section to be transferred with a packet is a working replay processing section, it transfers the packet to the relay processing section of the transfer destination and a protection relay processing section corresponding to the relay processing section.

Also, the packet routing apparatus is provided with a plurality of interface sections each being connected to some of a plurality of relay processing sections and at least one of a plurality of communication ports. The plurality of interface sections includes a least one working interface section which is connected to a working relay processing section and a working communication port and at least one of protection interface section which is connected to a protection relay processing section and a protection communication port. The protection interface section transmits a packet received from a connected relay processing section to a connected protection communication port, but it does not receive a packet transmitted from a connected communication port. When a working interface section detects a failure, the working interface section stops reception of a packet. On the other hand, the protection interface section starts reception of a packet transmitted from the connected protection communication port to transmit the received packet to a connected protection relay processing section.

With the above configuration, when protection switching is performed in the network layer, switching is performed from the working line to the protection line without updating the routing table. More specifically, on the transmission side, only one transmission destination stored in the routing table is used in both the working line and the protection line, and a packet identical to the packet to be transmitted to the working line is copied through a hardware processing but not a software processing to be transmitted to the protection line. On the other hand, a high speed protection switching is performed on the reception side only by performing close/open processing of the working line/protection line. Incidentally, at this time, in the close/open processing, a double reception of a packet or the like can be prevented by performing processings with a time difference within a maximum allowable range of a phase difference between the working line and the protection line.

Thereby, the protection switching can be performed in a short time without updating the routing table. Also, on the transmission side, since only one transmission destination stored in the routing table is used in the working line/protection line, a spare or protection buffer amount is not required.

Furthermore, even when IPv6 to which attention is paid as the next generation IP protocol instead of the IPv4 becomes standard and the IP address set in the routing table is extended from 32 bits to 128 bites, the protection switching can be performed without updating the routing table according to the protection switching apparatus and method. Also, since only one transmission destination stored in the routing table is used in both the working line and the protection line, high speed switching and buffer amount reduction can be achieved.

BRIEF DESCRIPTION OF THE DRAWINGS

FIG. 3 is a diagram showing a configuration of a routing table 22;

FIG. 4 is a diagram showing a configuration of an APS register 23;

FIG. 5 is a diagram showing port combinations of working NIF and protection NIF;

DETAILED DESCRIPTION OF THE EMBODIMENTS

Embodiments of the present invention will be explained below with reference to the drawings.

Figure 1:
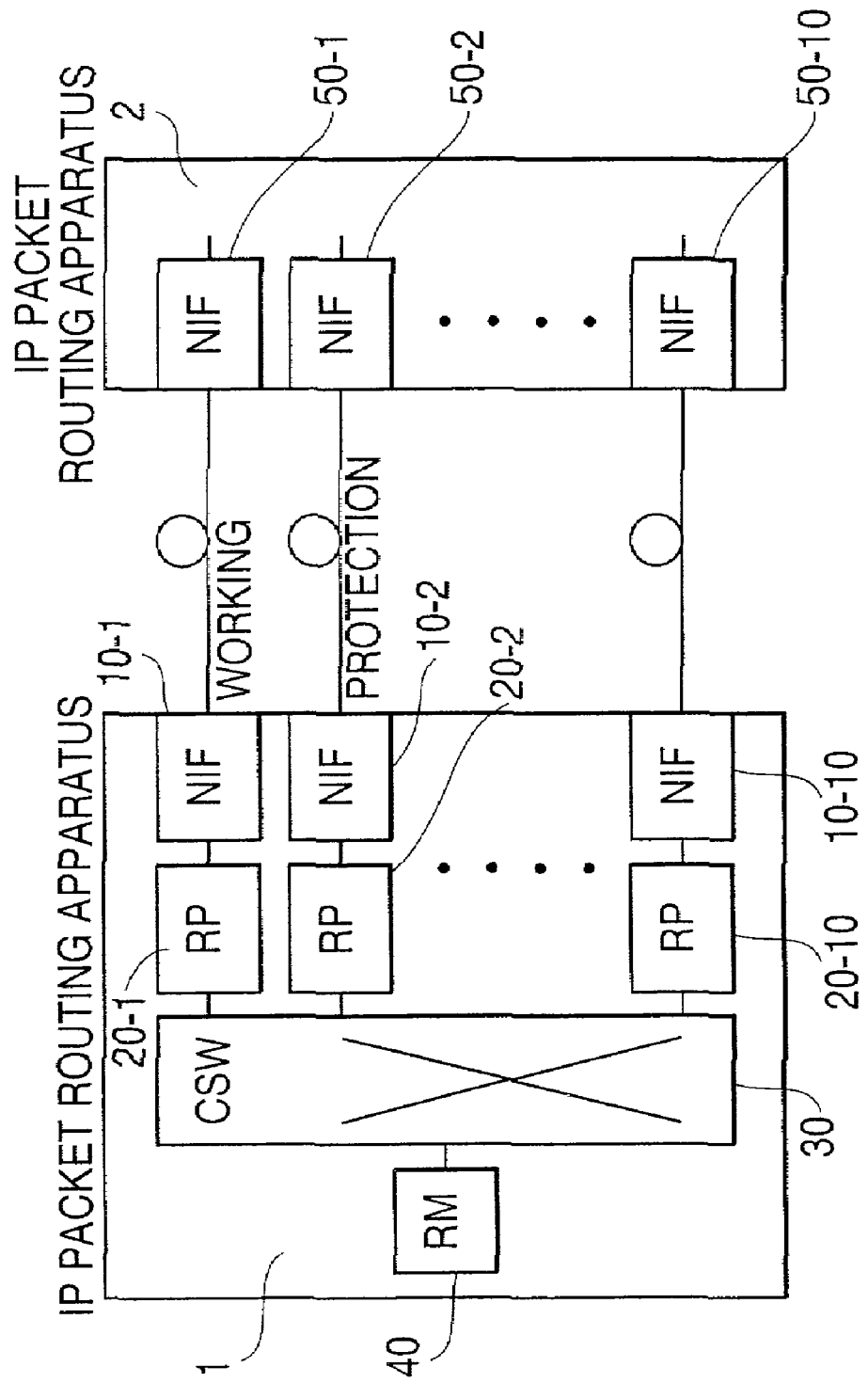
FIG. 1 is a schematic configuration diagram of a network including an IP packet routing apparatus.

FIG. 1 is a schematic configuration diagram of a network including an IP packet routing apparatus according to an embodiment of the present invention.

A network 100 is provided with, for example, an IP packet routing apparatus 1 and another IP packet routing apparatus 2 connected to the IP packet routing apparatus 1. The IP packet routing apparatus 1 and the IP packet routing apparatus 2 are connected to each other via an optical network (line). Incidentally, here, the network 100 comprises the IP packet routing apparatuses 1 and 2, but it may include a suitable number of IP packet routing apparatuses.

The IP packet routing apparatus 1 is provided with, for example, SDH network interface modules (NIFs) 10-1, 10-2 to 10-10, routing processor modules (RP) 20-1, 20-2 to 20-10, a cross bus switch (CSW) 30 and a routing manager module (RM) 40. Also, the IP packet routing apparatus 2 is provided with, for example, NIFs 50-1, 50-2 to 50-10, which are connected to the NIFs 10-1, 10-2 to 10-10 included in the IP packet routing apparatus 1. Incidentally, the IP packet routing apparatus 2 has the same configuration as that of the IP packet routing apparatus 1, and therefore illustration and explanation thereof will be omitted except for configurations of the NIF 50-1, 50-2 to 50-10 for convenience of explanation.

Here, for convenience of explanation, assuming that the RP20-1 and the NIF10-1 configure a working line and the RP20-2 and the NIF10-2 configure a protection line, a sequence of operations regarding input/output of a SDH frame will be explained schematically.

First, a case that a SDH frame output from the NIF 50-10 in the IP packet routing apparatus 2 is input into the IP packet routing apparatus 1 via the NIF 10-10 and it is output from the working line 10-1/protection line NIF10-2 will be explained. The NIF 10-10 performs layers 1 and 2 processings on the received SDH frame to extract an IP packet. The NIF 10-10 passes the extracted IP packet to the RP 20-10.

The RP 20-10 performs a layer 3 processing such as a routing processing, forwarding processing or the like on the IP packet. Also, the RP 20-10 outputs an IP packet to the CSW 30 addressing towards the working RP 20-1 according to a destination address included in the IP packet. The CSW 30 transmits the input IP packet to the working RP 20-1 and the protection RP 20-2. Also, the working RP 20-1 and the protection RP 20-2 transmit the IP packets received from the RP 20-10 to the working NIF 10-2 and the protection NIF 10-2 which are positioned on the output side, respectively. The working NIF 10-1 and the protection NIF 10-2 creates SDH frames from the IP packets to output them to the optical network (line) In this case, the SDH frames are transmitted to both a line connected to the working NIF and a line connected to the protection NIF.

Next, a case that the SDH frames output from the NIFs 50-1 and 50-2 in the IP packet routing apparatus 2 are input into the working NIF 10-1/protection NIF 10-2 and they are output from the NIF 10-10 will be explained. Both the working NIF 10-1 and the protection NIF 10-2 receive the SDH frames, but a line open processing is performed in the NIF 10-1 and a line close processing is performed in the NIF 10-2, respectively. For this reason, the protection NIF 10-2 with the closed line does not delivers an IP packet to the protection RP 20-2. Incidentally, the open processing and close processing of a line will be explained below in detail.

The working NIF 10-1 with an open line receives a SDH frame to perform layer 1 and 2 processings on the frame and extract an IP packet. The NIF 10-1 passes the extracted IP packet to the RP 20-1. The RP 20-1 performs a layer 3 processing such as a routing processing, a forwarding processing or the like on the IP packet. Also, the RP 20-1 transmits the IP packet to the RP 20-10 via the CSW 30 according to a destination IP address included in the IP packet. The RP 20-10 transmits the IP packet received from the RP 20-1 to the NIF 10-10 which serves as an output. The NIF 10-10 creates a SDH frame from the IP packet to output the SDH frame to a line.

On the other hand, when a failure occurs in a working line, a close processing of a line in the NIF 10-1 and an open processing of a line in the NIF 10-2 are respectively performed. Thereby, the IP packet is received in the NIF 10-2 with the open line and it is passed to the RP 20-2 from the NIF 10-2. Like the above, the IP packet is sent to the NIF 10-10 via the RP 21-10 and it is output as a SDH frame from the NIF 10-10.

Figure 2:
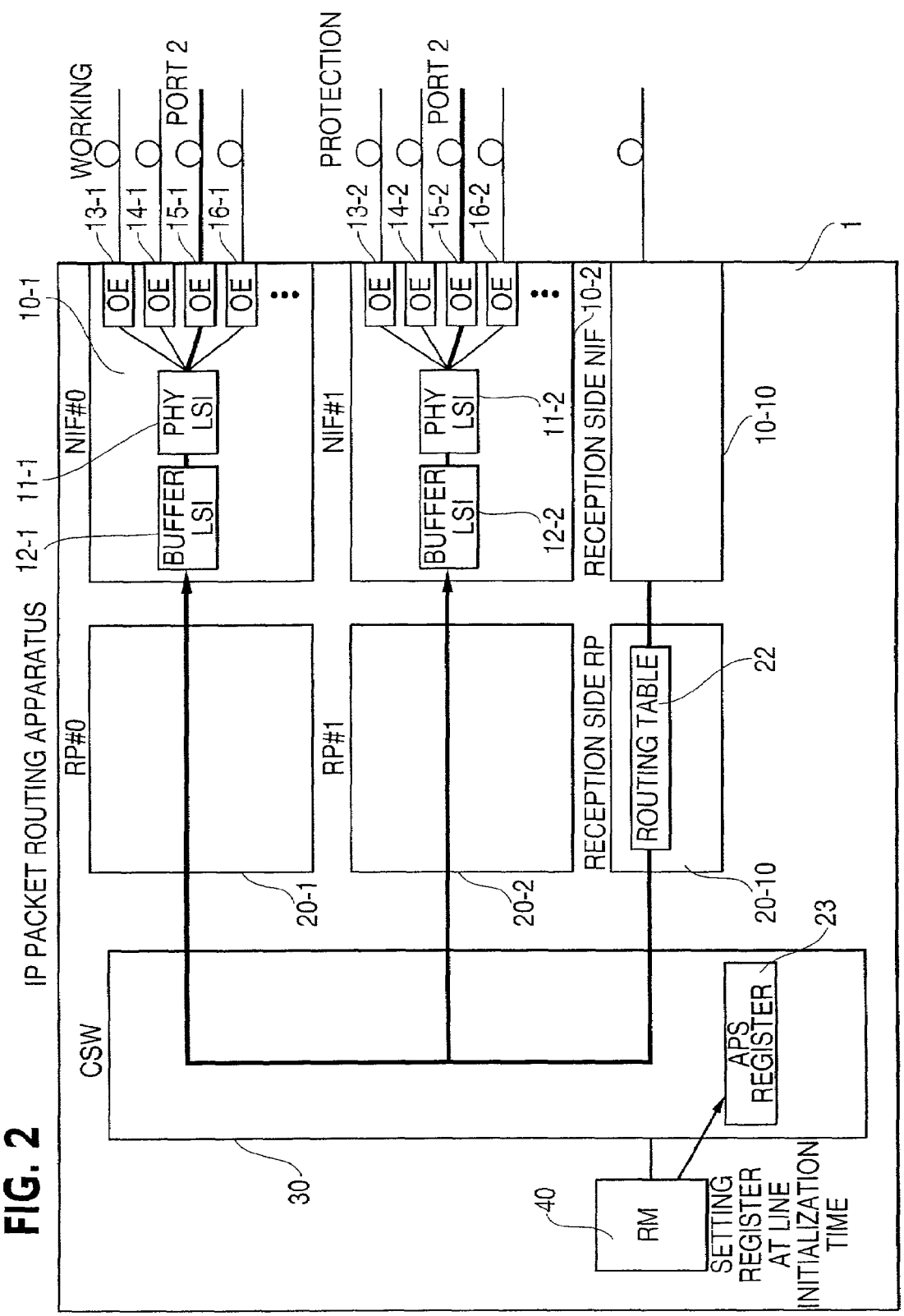
FIG. 2 is a diagram showing a configuration and a packet transmitting operation of an IP packet routing apparatus 1.

FIG. 2 is a diagram showing a configuration and a packet transmission operation of the IP packet routing apparatus 1. Incidentally, for convenience of explanation, not only a transmissions side function of a SDH frame when a network layer switching is performed but also the NIF 10-10 and RP 20-10 which serve as reception side in the IP packet routing apparatus 1 will be explained.

The IP packet routing apparatus 1 is provided with, for example, a reception side RP 20-10, a reception side NIF 10-10, a CSW 30, a RM 40, RP#0 20-1, a NIF#0 10-1, RP#1 20-2 and a NIF#1 10-2.

The NIF#0 10-1 includes, for example, a buffer LSI 12-1 having a buffer function, a PHY LSI 11-1 having a line terminating function, and OEs 13-1 to 16-1 which are optical modules having a photo-electric converting function. Like the above, the NIF#1 10-2 includes, for example, a buffer LSI 12-1, a PHY LSI 11-2 and OEs 13-2 to 16-2. Also, the working NIF#0 10-1 are provided with a plurality of ports corresponding to the OEs 13-1 to 16-1, respectively, and the protection NIF#1 10-2 is provided with a plurality of ports corresponding to the OEs 13-2 to 16-2, respectively. The respective ports in each of the working NIF#0 10-1 and the protection NIF#1 10-2 are respectively allocated with serial port numbers such as a Port 0, a Port 1, a Port 2, a Port 3 and so on. Then, the ports having the same number among the ports in the working NIF#0 10-1 and the protection NIF#1 10-2 are combined to configure a working port and a protection port. The combination of the working port and the protection port will be explained in detail. In FIG. 2, the IP packet routing apparatus 2 transmits identical SDH frames from a working port which is a Port 2 of the working NIF#0 10-1 and a protection port which is a Port 2 of the protection NIF#1 10-2 corresponding thereto. Incidentally, not only the NIF#0 10-1 and the NIF#1 10-2 but also all NIFs including the reception side NIF 10-10 are provided with the same configuration as the above-mentioned NIF#0 10-1.

Also, the CSW 30 is provided with, for example, a protection switching control register (APS register) 23.

Incidentally, switching of lines at a time of failure occurrence is performed at confounding points between the RP#0 20-1 and the NIF#0 10-1, the RP#1 20-2 and the NIF#1 10-2, and the CSW 30. That is, the switching is performed at connection points between the CSW 30 and the respective the RP#0 20-1 and RP#1 20-2. It becomes possible to recover a line failure, an apparatus failure in a RP or a NIF or the like by performing switching at such connection points.

The reception side RP 20-10 is provided with a storage section. This storage section stores, for example, a routing table 22 therein. Stored in this routing table 22 are an output RP number and an output port number corresponding to a destination IP address included in the IP packet extracted from the SDH frame, for example.

FIG. 3 is a diagram showing a configuration of the routing table 22.

Stored in the routing table 22 are a destination IP address "192. 168.1.1 ", and a RP number "#0" and a port number "Port 2" corresponding to this destination IP address, for example.

Incidentally, not only the reception side RP 20-10 but also all the NIFs are provided with storage sections, and the respective storage sections store similar routing tables, respectively.

Next, the APS register 23 will be explained.

In order to allow the APS register 23 to perform switching of lines, it is set by the RM 40 that the RP#0 20-1 and the RP#1 20-2 are lines (APS lines) which have been made redundant to each other, for example, at a line initializing time. Incidentally, the setting of the APS register 23 may be directly performed externally by a maintenance person instead of the RM 40. Also, in this embodiment, the APS register 23 is provided inside the CSW 30, but it may be provided outside it.

FIG. 4 is a diagram showing a configuration of the APS register 23.

The APS register 23 is constituted with RP number sets "#0/1", "#2/3", "#4/5", "#6/7", and "#8/9", and information pieces "0 or 1" indicating presence/absence of a redundant line (APS line) corresponding to each RP number set. Specifically, in the APS register 23, when the information piece indicating presence/absence of the APS line corresponding to the RP number set "#0/1" is set to "APS presence: 1", the RP#0 20-1 and the RP#1 20-2 corresponding to the RP number set "#0/1" become lines redundant to each other (APS lines) so that the RP#0 20-1 becomes a working APS line and the RP#1 20-2 becomes a protection APS line. On the other hand, when the information piece indicating presence/absence of an APS line corresponding to the RP number set "#0/1" is set to "APS absence: 0", the RP#0 20-1 and the RP#1 20-2 become lines independent of each other.

Here, when the information piece indicating presence/absence of an APS line corresponding to the RP number set "#0/1" in the APS register 23 is set to "APS presence: 1" and the RP number "#0" corresponding to the destination IP address "192.168.1.1" is stored in the routing table 22, the IP packet addressed to the RP#0 20-1 is also transmitted to the RP#1 20-2 by the CSW 30.

That is, when any RP number set in the APS register 23 is set to "APS presence", the CSW 30 copies the IP packet through a hardware processing to transmit the IP packets to both the working line and the production line by storing only a younger number side (for example, the RP number "#0" of the RP set "#0/1") in the routing table without considering which RP (for example, the RP#0 20-1 or the RP#1 20-2) corresponding to the RP number set is the working line. Also, even when a switching has been performed from the working line to the protection line, packet transfer is performed to both the lines so that it is unnecessary to change the RP number which has been stored in the routing table 22.

Thereby, when packets are transferred to the working line and the protection line, only one transmission destination (a younger number of the RP number set) stored in the routing table 22 is used, so that an extra or protection buffer amount is not required. Also, since it is unnecessary to rewrite the routing table 22 at a time of switching from the working line to the protection line, a high speed switching can be carried out. Incidentally, as the only one transmission destination to be stored in the routing table 22, a proper setting may be carried out such that another other than the younger number of the RP number set is stored.

FIG. 5 is a diagram showing port combinations of working NIF-protection NIF.

The working NIF and the protection NIF included in the IP packet routing apparatus 1 are provided with many ports, as described above. For example, the working NIF#0 10-1 is provided with many ports corresponding to the OEs 13-1 to 16-1, respectively, and similarly the protection NIF#1 10-2 is provided with many ports corresponding to the OEs 13-2 to 16-2, respectively.

In the example shown in FIG. 5, each of the working NIF (Slot 0) and the protection NIF (Slot 1) is provided with 8 ports.

In the working NIF and the protection NIF, ports having the same port number are combined to configure the working ports and the protection ports. For example, in FIG. 5, the working ports (Port 0 to Port 7) included in the working NIF (Slot 0) 3 and the protection ports (Port 0 to Port 7) included in the protection NIF (Slot 1) 4 constitutes working -protection Port combination 0 (Ports 0) to working-protection Port combination 7 (Ports 7) for respective ports having the same port number. Accordingly, at a time of line switching, a switching is performed from each working port in the working NIF to a protection port having the same port number as the working port according to the working-protection Port combinations.

Thus, even when there are many ports in the NIF, necessity for an extra design is removed by causing a plurality of pairs of ports having the same numbers to correspond to each other, thereby allowing switching between the working line and the protection line.

In FIG. 5, the working NIF 3 and the protection NIF 4 are NIFs adjacent to each other and respective ports in these NIFs are combined, but such a configuration can be employed that the working NIF 4 and the protection NIF 4 are not adjacent to each other and NIFs arranged to be far from each other are combined to form a pair of working and protection.

Figure 6:
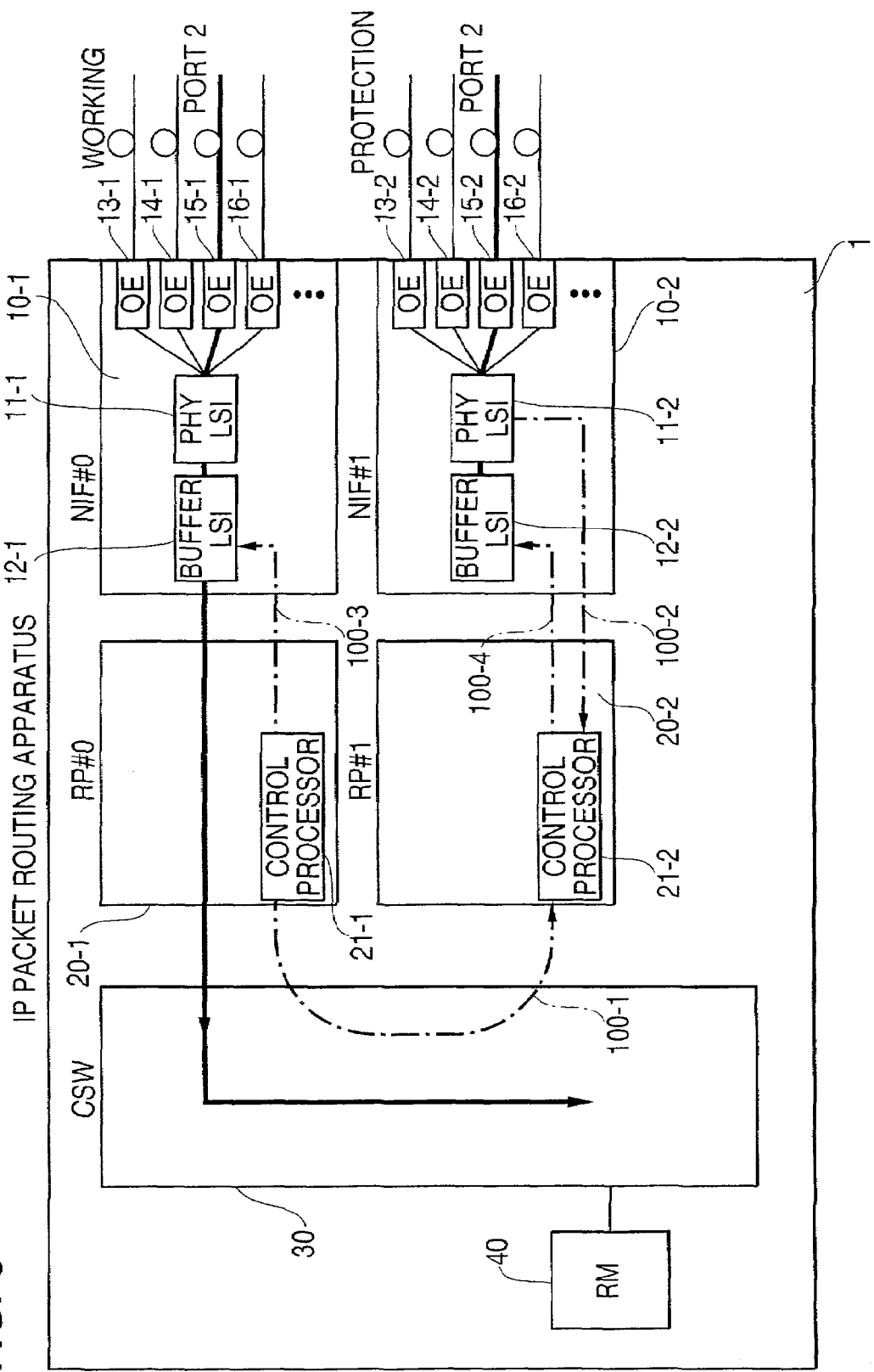
FIG. 6 a diagram showing a packet reception operation of the IP packet routing apparatus 1.

FIG. 6 is a diagram showing an operation for a frame reception of the IP packet routing apparatus 1. Here, a function for a frame reception in the IP packet routing apparatus 1 will be explained.

Incidentally, FIG. 6 shows only the CSW 30, the RM 40, the RP#0 20-1, the NIF#0 10-1, the RP#1 20-2, and the NIF#1 10-2 of the IP packet routing apparatus 1 shown in FIG. 2. Also, the RP#0 20-1 is provided with a control processor 21-1, and the RP#1 20-2 is provided with a control processor 21-2.

The Port 2 of the working NIF#0 10-1 and the Port 2 of the protection NIF#1 10-2 corresponding thereto in the IP packet routing apparatus 1 are input with identical SDH frames sent from the IP packet routing apparatus 2 via a network.

The control processor 21-1 of the working RP#0 20-1 notifies the status of the working PPP line to the control processor 21-2 of the RP#1 20-2 through a packet communication 100-1 in advance, so that the status of the PPP lines in the working and the protection are put in the same status. Also, the control processor 21-2 of the RP#1 20-2 puts itself in a status waiting for an interruption signal 100-2 generated due to a change of the K1/K2 byte status from the PHY LSI 11-2. Incidentally, when the PHY LSI 11-2 detects the K1/K2 byte status received at each port and it detects a change of the status, it transmits the interruption signal 100-2 to the control processor 21-2. Furthermore, the control processor 21-1 of the working NIF#0 10-1 transmits a line open processing signal (command) 100-3 to the buffer LSI 12-1 to put the buffer LSI 12-1 in an open state. Also, the control processor 21-2 of the protection NIF#1 10-2 transmits a line close processing signal (command) 100-4 to the buffer LIS 12-2 to put the buffer LSI 12-2 in a close state.

Figure 7:
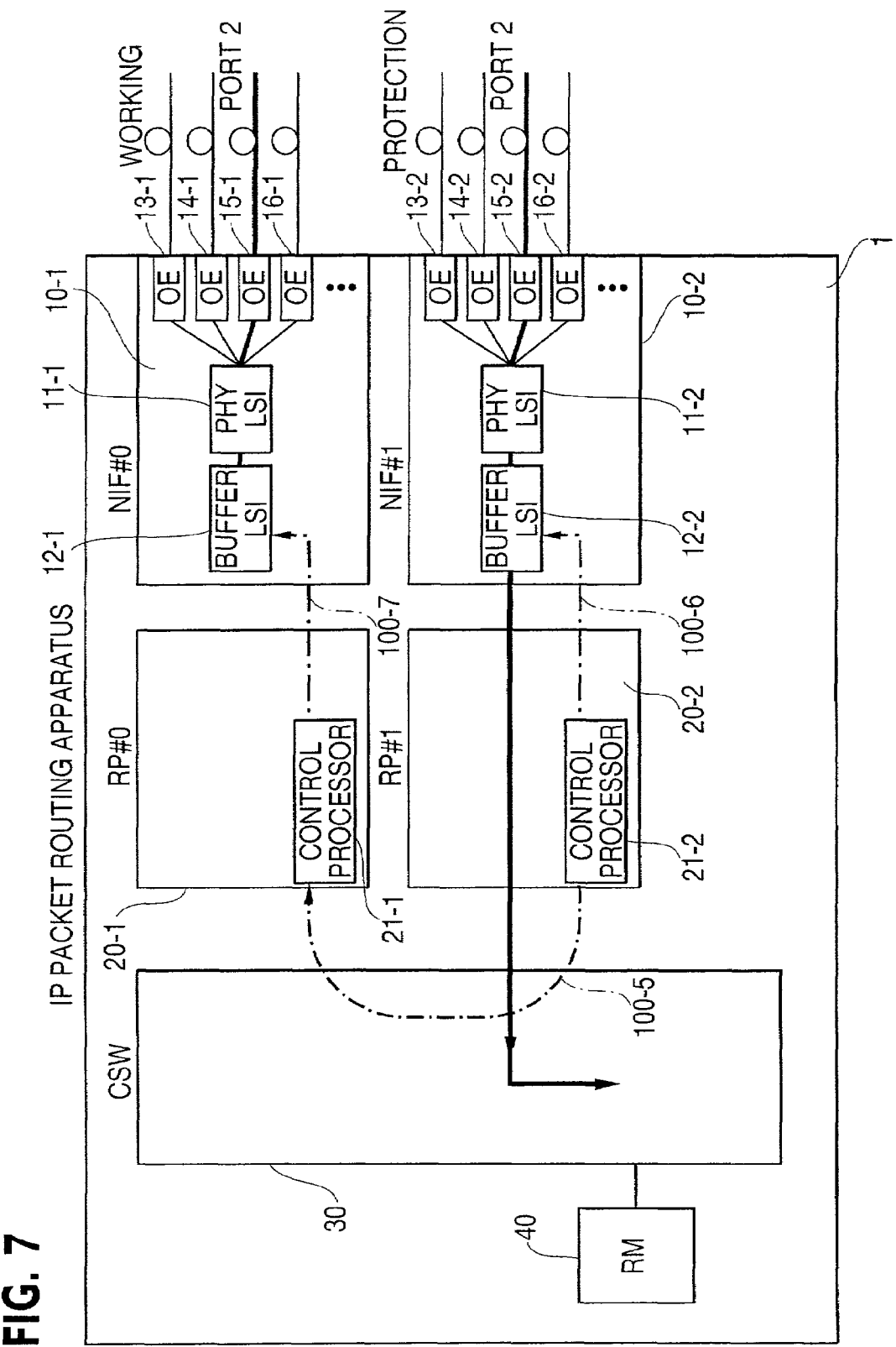
FIG. 7 is a diagram showing a line switching operation of the IP packet routing apparatus 1.

FIG. 7 is a diagram showing an operation for a line switching in the IP packet routing apparatus 1.

Here, a function of the IP packet routing apparatus 1 when a line switching in a network layer is performed will be explained.

As described above, first, the control processor 21-2 of the protection RP#1 20-2 is put in the state of waiting for an interruption signal 100-2 due to a change of the K1/K2 byte status from the PHY LSI 11-2. In this state, when the change of the K1/K2 byte status is detected by the PHY LSI 11-2, an interruption signal 100-2 is transmitted from the PHY LSI 11-2 and it is detected by the control processor 21-2. Then, the control processor 21-2 sends a switching instruction 100-5 to the control processor 21-1 of the working RP#0 20-1 through a packet communication. The control processor 21-1 of the protection RP#1 20-1 transmits a line close processing signal 100-6 to the buffer LSI 12-1 of the working NIF#0 10-1 to put the buffer LSI 12-1 in a close state. Also, the control processor 21-2 of the protection RP#1 20-2 transmits a line open processing signal 100-7 to the buffer LSI 12-2 of the protection NIF#1 10-2 to put the buffer LSI 12-2 in an open state. Thus, a line switching is completed.

In the line switching in this embodiment, the close processing of the buffer LSI 12-1 of the working NIF#0 10-1 and the open processing of the buffer LSI 12-2 of the protection NIF#0 10-2 are performed with a time difference within a maximum allowable range of the phase difference between the working line and the protection line. That is, it is not that a switching is performed by a selector or the like instantaneously at a time of switching but that the close processing of the working buffer LSI 12-1 is first performed and then the open processing of the protection buffer LSI 12-2 is performed after a certain time elapses.

Thereby, it becomes possible to prevent double reception of the frame in the IP packet routing apparatus 1. Incidentally, there is a problem that a frame disappearance occurs at a time of switching from a working to a protection, passing of a received frame occurs, or the like, but such a problem can be overcome by processing of a layer 3 or a higher layer.

Next, an operation (control sequence) performed when a failure is detected in the network 100 including the IP packet routing apparatuses 1 and 2 will be explained.

Figure 8:
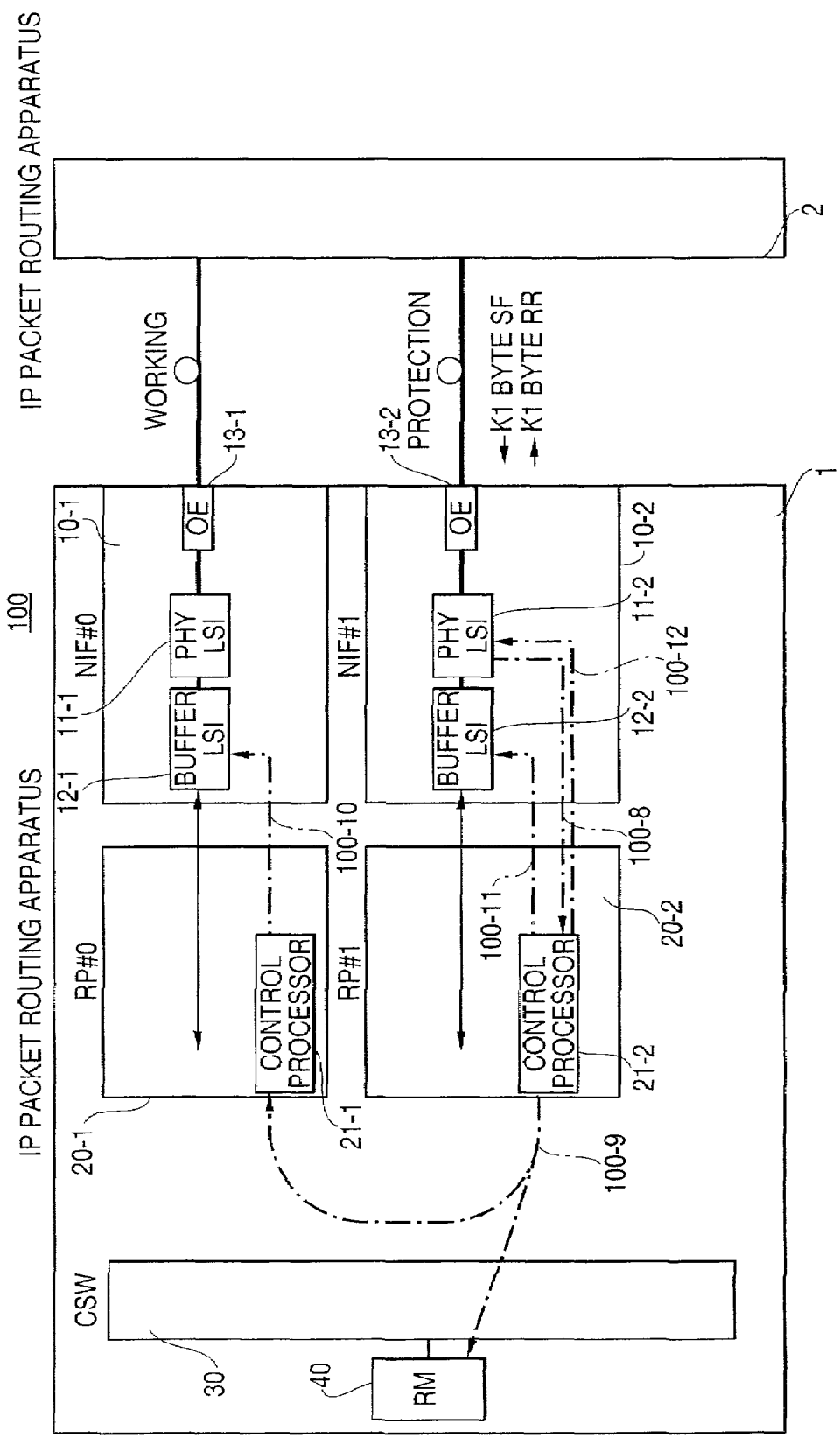
FIG. 8 is a diagram showing a control sequence in the IP packet routing apparatus 1 performed when a hardware failure is detected in an IP packet routing apparatus 2.

FIG. 8 is a diagram showing a control sequence in the IP packet routing apparatus 1 which is performed when a failure is detected in the IP packet routing apparatus 2.

The Port 0 corresponding to OE 13-1 of the working NIF#0 10-1 and the Port 0 corresponding to the OE 13-2 of the protection NIF#0 10-2 in the IP packet routing apparatus 1 are input with identical SDH frames sent from the IP packet routing apparatus 2 via a network.

When a LOS failure is detected in the IP packet routing apparatus 2, the IP packet routing apparatus 2 transmits a signal indicating a signal failure SF using K1 bytes. The PHY LSI 11-2 in the protection NIF#1 10-2 of the IP packet routing apparatus 2 receives the signal and detects the signal failure SF from the K1 bytes in the signal. Then, the PHY LSI 11-2 in the protection NIF#1 10-2 transmits an APS interruption signal 100-8 to the control processor 21-2 in the protection RP#1 20-2.

The control processor 21-2 which has received the APS interruption signal 100-8 transmits an APS switching instruction signal 100-9 to the RM 40 and the control processor 21-1 in the working RP#1 20-1.

When the APS switching instruction signal 100-9 is received, the control processor 21-1 of the working RP#1 20-1 transmits a line close processing signal 100-10 to the buffer LSI 12-1 of the working NIF#0 10-1. Thereafter, the control processor 21-2 of the protection RP#1 20-2 transmits a line open processing signal 100-11 to the buffer LSI 12-2 of the protection NIF#1 10-2 after a certain time elapses. Thus, a line switching is performed.

Next, the control processor 21-2 of the protection RP#1 20-2 notifies a line switching completion signal 100-12 to the PHY LSI 11-2. When the PHY LSI 11-2 receives the line switching completion signal 100-12, it transmits a signal indicating a reverse request RR to the IP packet routing apparatus 2 using the K1 bytes.

Incidentally, a series of the above operations from a failure detection in the IP packet routing apparatus 2 to a switching operation completion are completed within 50 ms.

Figure 9:
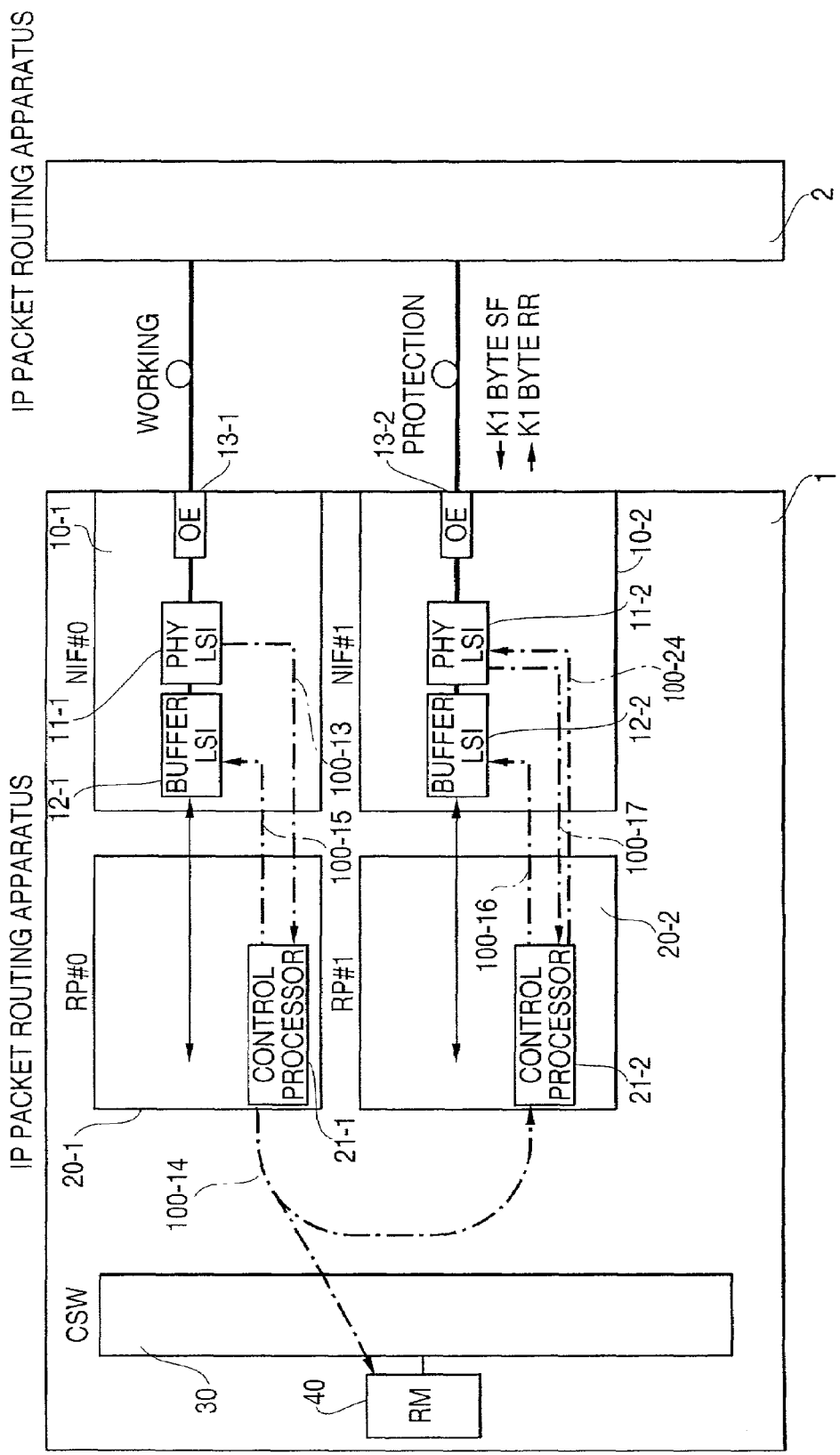
FIG. 9 is a diagram showing a control sequence in the IP packet routing apparatus 1 performed when a hardware failure is detected in its own apparatus.

FIG. 9 is a diagram showing a control sequence in the IP packet routing apparatus 1 performed when a hardware failure is detected in the IP packet routing apparatus 1.

In the IP packet routing apparatus 1, an information piece indicating presence/absence of an APS line corresponding to a RP number set "#0/1" in the APS register in the CSW 30 is set to "APS presence" in advance. For this reason, when the CSW 30 of the IP packet routing apparatus 1 receives an IP packet addressing to the RP#0 20-1, it copies it through a hardware processing to transfer the IP packet and the copied IP packet to the RP#0 20-1 and the RP#1 20-2. The RP#0 20-1 and the RP#1 20-2 transfer the received IP packets to the NIF#0 10-1 and the NIF#1 10-2, respectively. The NIF#0 10-1 generates a SDH frame to transmit it from the Port 0 via the buffer LSI 12-1, the PHY LSI 11-1 and the OE 13-1. Like the above, the NIF#1 10-2 creates a SDH frame to transmit it from the Port 0 via the buffer LSI 12-2, the PHY LSI 11-2 and the OE 13-2.

As one example, here, it is assumed that a hardware failure has occurred at the PHY LSI 11-1 of the working NIF#0 10-1 in the IP packet routing apparatus 1. First, the PHY LSI 11-1 detects a failure, and it transmits an interruption signal 100-13 to the control processor 21-1 of the working RP#0 20-1. The control processor 21-1 which has received the interruption signal 100-13 judges that an APS switching is allowable and it transmits an APS switching instruction signal 100-14 to the RM 40 and the control processor 21-2 of the protection RP#1 20-2. Thereafter, the control processor 21-1 transmits a line close processing signal 100-15 to the buffer LSI 12-1 of the working NIF#0 10-1.

The control processor 21-2 of the protection RP#1 20-2 which has received the APS switching instruction signal 100-14 transmits a line open processing signal 100-16 to the buffer LSI 12-2 of the protection NIF#1 10-2. Thereby, a close processing of the working line connected to the PHY LSI 11-1 where the failure has occurred and the open processing of the protection line are completed.

Also, the control processor 21-2 notifies a line switching request signal 100-24 to the PHY LSI 11-2. When the PHY LSI 11-2 receives the line switching request signal 100-24, it transmits a signal indicating a signal failure SF to the IP packet routing apparatus 2 using K1 bytes.

After a line switching has been performed in the IP packet routing apparatus 2, the IP packet routing apparatus 2 transmits a signal indicating Reverse Request RR to the IP packet routing apparatus 1 using K1 bytes. Incidentally, in this case, a series of control sequences for a line switching performed in the IP packet routing apparatus 2 is the same as the control sequences which have been explained with reference to FIG. 8 and explanation thereof will be omitted.

The PHY LSI 11-2 in the protection NIF#1 10-2 of the IP packet routing apparatus 1 receives a signal from the IP packet routing apparatus 2 and it detects Reverse Request RR from the K1 bytes in the signal. Then, the PHY LSI 11-2 transmits an APS interruption 100-17 to the control processor 21-2 of the protection RP#1 20-2.

Incidentally, a series of the above operations from a failure detection in the IP packet routing apparatus 1 to a switching operation completion are completed within 50 ms.

Figure 10:
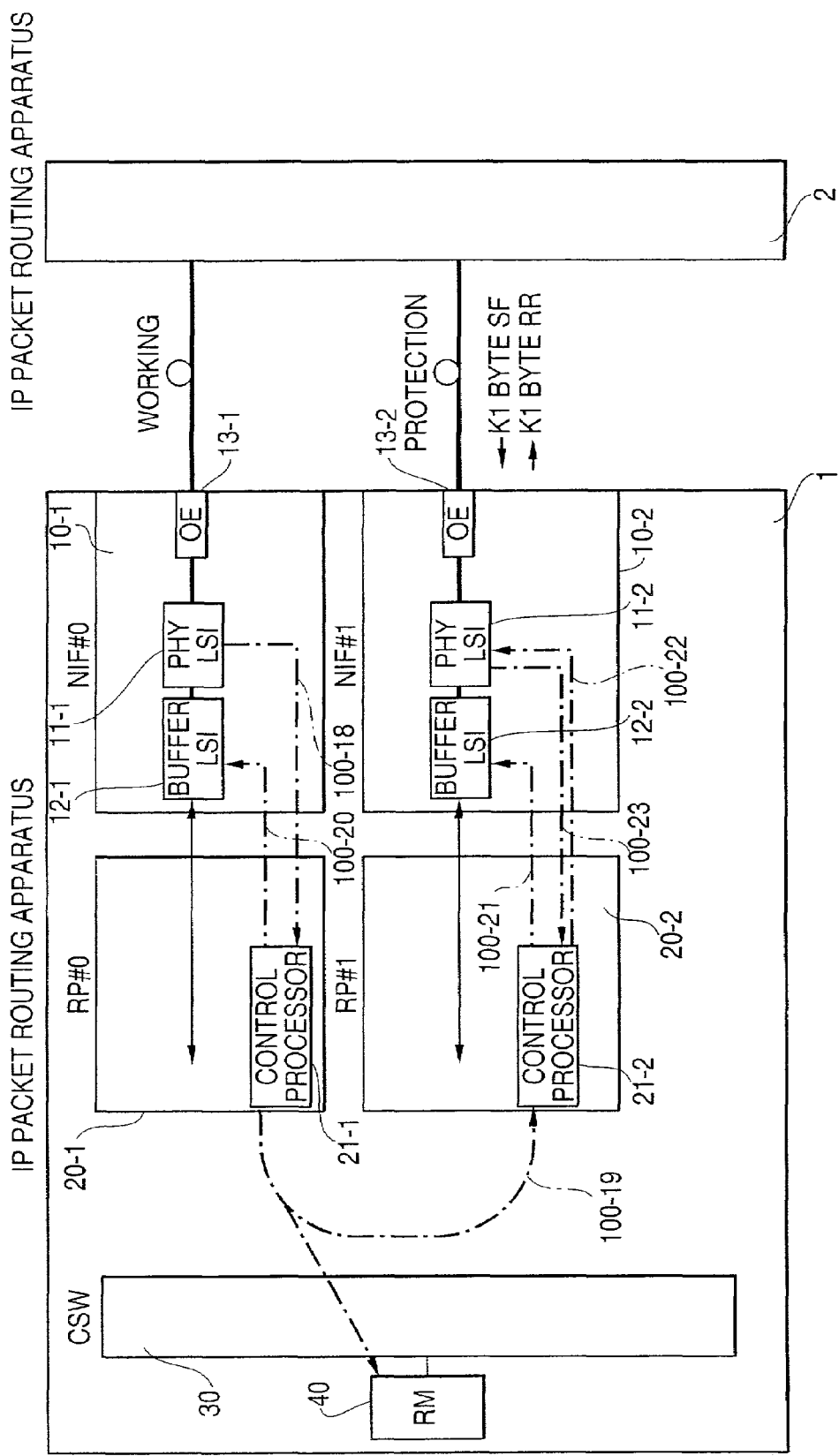
FIG. 10 is a diagram showing a control sequence performed when a line failure is detected by the IP packet routing apparatus 1 itself.

FIG. 10 is a diagram showing a control sequence performed when the IP packet routing apparatus 1 itself detects a line failure.

Like the explanation with reference to FIG. 9, in the IP packet routing apparatus 1, the information piece indicating presence/absence of an APS line corresponding to the RP number set "#0/1" in the APS register in the CSW 30 is set in "APS presence" in advance. For this reason, when the CSW 30 of the IP packet routing apparatus 1 receives an IP packet addressing to the RP#0 20-1, it copies the IP packet to transfer the IP packets to the RP#0 20-1 and the RP#1 20-2.

As one example, here, it is assumed that a line failure is detected in the working NIF#0 10-1. First, the PHY LSI 11-1 of the working NIF#0 10-1 detects the line failure and it transmits an interruption signal 100-18 to the control processor 21-1 of the working RP#0 20-1. The control processor 21-1 which has received the interruption signal 100-18 judges that an APS switching is allowable, and it transmits an APS switching instruction signal 100-19 to the RM 40 and the control processor 21-2 of the protection RP#1 20-2. Thereafter, the control processor 21-1 transmits a line close processing signal 100-20 to the buffer LSI 12-1 of the working NIF#0 10-1.

The control processor 21-2 of the protection RP#1 20-2 which has received the APS switching instruction signal 100-19 transmits a line open processing signal 100-21 to the buffer LSI 12-2 of the protection NIF#1 10-2. Thereby, a close processing of the working line where the failure has occurred and an open processing of the protection line are completed.

Also, the control processor 21-2 notifies a line switching request signal 100-22 to the PHY LSI 11-2. When the PHY LSI 11-2 receives the line switching request signal 100-22, it transmits a signal indicating a signal failure SF to the IP packet routing apparatus 2 using K1 bytes.

After the line switching has been performed in the IP packet routing apparatus 2, the IP packet routing apparatus 2 transmits a signal indicating Reverse Request RR to the IP packet routing apparatus 1 using K1 bytes. Incidentally, a series of control sequence for line switching performed in the IP packet routing apparatus 2 is similar to the control sequence which has been explained with reference to FIG. 8, and explanation thereof will be omitted.

The PHY LSI 11-2 in the protection NIF#1 10-2 of the IP packet routing apparatus 1 receives a signal from the IP packet routing apparatus 2 and it detects Reverse Request RR form the K1 byte in the signal. Then, the PHY LSI 11-2 transmits an APS interruption signal 100-23 to the control processor 21-2 of the protection RP#1 20-2.

Incidentally, the above series of operations from a failure detection in the IP packet routing apparatus 1 to a switching operation completion are completed within 50 ms.

Thus, the IP packet routing apparatuses 1 and 2 according to this embodiment allows a line switching in a short time without updating the routing table 22. Also, in the above-mentioned embodiment, since only one transmission address which has been stored in the routing table 22 is used for transferring a packet to the working RP and the protection RP, an extra buffer amount is not required. Furthermore, according to the above embodiment, since rewriting of the routing table 22 is not required at a time of switching, a high speed switching can be performed.

What is claimed is:

1. A packet routing apparatus which performs transmission/reception of a packet to a network, comprising:
   a plurality of communication ports including at least one working communication port which performs transmission/reception of a packet for a network and at least one protection communication port which performs transmission/reception of a packet identical to the packet which is subjected to transmission/reception by the working communication port for the network;
   a plurality of relay processing sections each being connected to at least one communication port of the plurality of communication ports, the plurality of relay processing sections including at least one working relay processing section connected to the at least one working communication port and at least one protection relay processing section connected to the at least one protection communication port, each relay processing section transmitting a packet transferred from another relay processing section to a connected communication port, and the relay processing section transmitting the received packet to another relay processing section according to destination information included in the received packet from the connected communication port;

a configuration information storage section which stores therein information indicating whether each of the plurality of relay processing sections is a working relay processing section or a protection relay processing section corresponding to one of the working relay processing section; and a packet switch section which is connected to the plurality of relay processing sections and which receives a packet transmitted from any relay processing section to transfer the packet to another relay processing section according to destination information included in the packet, wherein, where the packet switch section references to the configuration information storage section and finds that a transfer destination of the packet is a working relay processing section, the packet switch section transfers the packet to the relay processing section of the transfer destination and a protection relay processing section corresponding to the relay processing section of the transfer destination.

2. A packet routing apparatus according to claim 1, wherein each of the plurality of relay processing sections is provided with a storage section which stores route information including a plurality of destination addresses and information indicating a relay processing section corresponding to each destination address, and when the relay processing section receives a packet from the communication port, the relay processing section references to the route information to identify another relay processing section corresponding to a destination address included in the packet and transmit the packet to the packet switch section; and in a case that the packet switch section receives the packet, where the packet switch section references to the information stored in the configuration information storage section and finds that the identified relay processing section is a working relay processing section, the packet switch section transmits the packet to the identified relay processing section and a protection relay processing section corresponding to the identified relay processing section.

3. A packet routing apparatus according to claim 1, wherein the relay processing section of the transfer destination and the protection relay processing section receives the packets transferred from the packet switch section and transmit the received packets to a working communication port and a protection communication port which are respectively connected to thereto, and the working communication port and the protection communication port transmit the packets to networks which are respectively connected thereto.

4. A packet routing apparatus according to claim 1, wherein each of the plurality of relay processing sections is connected with at least two communication ports of the plurality of communication ports, and each of at least two working communication ports connected to the working relay processing section respectively correspond to each of at least two protection communication ports a one-to-one manner.

5. A packet routing apparatus according to claim 1, further comprising:

a plurality of interface sections which are each connected to one relay processing section of the plurality of relay processing sections and at least one communication port of the plurality of communication ports, wherein each interface section transmits a packet received from the connected communication port to the connected relay processing section and transmits a packet received from the connected relay processing section to the connected communication port.

6. A packet routing apparatus according to claim 5, wherein each of the plurality of interface sections further includes:

a buffer which temporarily stores a packet received from the connected communication port or the connected relay processing section; and a failure detection section which detects a failure, wherein, when the failure detection section of the interface section detects a failure, the buffer of the interface section stops reception of the packet.

7. A packet routing apparatus according to claim 5, wherein the plurality of interface sections includes at least one working interface section connected to the working relay processing section and the working communication port and at least one protection interface section connected to the protection relay processing section and the protection communication port; and the protection interface section transmits a packet received from the connected relay processing section to the connected communication port and does not receive a packet transmitted from the connected communication port.

8. A packet routing apparatus according to claim 7, wherein the working interface section and the protection interface section each further comprise:

a buffer which temporarily stores a packet received from the connected communication port and the connected relay processing section; and a failure detection section which detects a failure, wherein in a case that the failure detection section of the working interface section detects a failure, the buffer of the working interface section stops reception of the packet, and the buffer of the protection interface section starts reception of a packet transmitted from the connected protection communication port and transmits the received packet to the connected protection relay processing section.

9. A packet routing apparatus according to claim 8, wherein the working relay processing section and the protection relay processing section each further include a control section;

when the failure detection section of the working interface section detects a failure, the failure detection section thereof notifies the failure to the control section of the working relay processing section;

the control section of the working relay processing section instructs the control section of the protection relay processing section to perform switching according to notification from the failure detection section and instructs the buffer of the working interface section to stop reception of a packet; and the control section of the protection relay processing section instructs the buffer of the protection interface section to start reception of a packet according to the switching instruction.

10. A packet routing apparatus according to claim 9, wherein an instruction to the buffer of the protection interface section from the control section of the protection relay processing section is generated after a predetermined time from an instruction to the buffer of the working interface section from the control section of the working relay processing section.

11. A method of communicating a packet in a packet routing apparatus comprising a plurality of communication ports including at least one working communication port which performs transmission/reception of a packet for a network and at least one protection communication port which performs transmission/reception of a packet identical to the packet which is subjected to transmission/reception by the working communication port for the network, a plurality of relay processing sections, each being connected to at least one communication port of the plurality of communication ports, including at least one working relay processing section connected to the at least one working communication port and at least one protection relay processing section connected to the at least one protection communication port, and a packet switch section which is connected to the plurality of relay processing sections and which receives a packet transmitted from one of the relay processing section to transfer the packet to another relay processing section according to destination information included in the packet, the method comprising the steps of:

storing information indicating whether each of the plurality of relay processing sections is a working relay processing section or a protection relay processing section corresponding to any working relay processing section;

when any communication port receives a packet from the network, transmitting the packet to a relay processing section connected to the communication port;

identifying in the relay processing section a relay processing section to transfer the packet according to destination information included in the packet and transmitting the packet to the packet switch section;

judging in the packet switch section whether or not the identified relay processing section is the working relay processing section according to the stored information and, when identified relay processing section is the working relay processing section, transferring the packet to the working relay processing section and the protection relay processing section;

transmitting the packet from the working relay processing section and the protection relay processing section to the working communication port and the protection communication port, respectively; and transmitting the packets from the working communication port and the protection communication port to the network.

12. A method of communicating a packet according to claim 11, further comprising the steps of:

receiving identical packets in the working communication port and the protection communication port from the network, respectively;

transferring the packet received in the working relay processing section to the packet switch section; and not transmitting the packet received in the protection relay processing section to the packet switch section.

13. A method of communicating a packet according to claim 12, further comprising the steps of:

detecting a failure by the working relay processing section;

instructing switching from the working relay processing section to the protection relay processing section;

stopping transmission of the packet received in the working relay processing section to the packet switch section; and starting transmission of the packet received in the protection relay processing section to the packet switch section.

14. A method of communicating a packet according to claim 13, wherein the step of starting transmission of the packet received in the protection relay processing section is performed after a predetermined time from the step of stopping transmission of the packet received in the working relay processing section.

15. A packet routing apparatus which is connected to another packet routing apparatus via a first transmission lines and a second transmission line and which performs switching between the first and second transmission lines, comprising:

first and second input/output interfaces which are connected to said first and second transmission lines, respectively;

a routing table which stores routing processor (RP) numbers and port numbers which are allocated to said first and second input/output interfaces so as to correspond to destination addresses;

a protection switching control register which stores presence/absence of protection switching so as to correspond to the RP numbers;

a routing processor which references to the routing table on the basis of a destination address included in a packet input from the input/output interface to obtain the RP number and the port number, thereby determining an input/output interface applied for outputting a packet; and a switch section which references to the protection switching control register on the basis of the RP number and the port number obtained from the routing table and which, when the protection switching is present, transfers an input packet to a port of said first input/output interface determined by the routing processor and a port of said second input/output interface corresponding to said first input/output interface.

* * * * *